United States Patent
Ha et al.

(10) Patent No.: US 9,344,644 B2
(45) Date of Patent: May 17, 2016

(54) METHOD AND APPARATUS FOR IMAGE PROCESSING

(71) Applicant: Samsung Electronics Co., Ltd., Gyeonggi-do (KR)

(72) Inventors: Dae-Sung Ha, Gyeonggi-do (KR); Moon-Soo Kim, Seoul (KR); Hong-Suk Choi, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 14/183,678

(22) Filed: Feb. 19, 2014

(65) Prior Publication Data
US 2014/0232906 A1    Aug. 21, 2014

(30) Foreign Application Priority Data
Feb. 21, 2013    (KR) .................. 10-2013-0018642

(51) Int. Cl.
*H04N 5/232*    (2006.01)
*H04N 5/225*    (2006.01)
*H04N 5/262*    (2006.01)
*H04N 5/265*    (2006.01)

(52) U.S. Cl.
CPC ............ *H04N 5/265* (2013.01); *H04N 5/2258* (2013.01); *H04N 5/23219* (2013.01); *H04N 5/23293* (2013.01); *H04N 5/2621* (2013.01)

(58) Field of Classification Search
None
See application file for complete search history.

(56) References Cited

U.S. PATENT DOCUMENTS

| | | | | |
|---|---|---|---|---|
| 2009/0201313 | A1* | 8/2009 | Thorn ........................... | 345/620 |
| 2010/0053212 | A1* | 3/2010 | Kang et al. .................... | 345/629 |
| 2012/0057028 | A1* | 3/2012 | Tanaka .......................... | 348/169 |

FOREIGN PATENT DOCUMENTS

KR    10-2012-0050614 A    5/2012

* cited by examiner

*Primary Examiner* — Lin Ye
*Assistant Examiner* — Euel Cowan
(74) *Attorney, Agent, or Firm* — Cha & Reiter, LLC.

(57) ABSTRACT

A method for use in an electronic device is provided, including: acquiring a first picture through a first image sensor; acquiring a second picture through a second image sensor; detecting, by a processing circuitry, an image of a body part in the second picture; creating a third picture based on the image of the body part; and displaying the first picture together with the third picture as a preview image.

13 Claims, 6 Drawing Sheets

METHOD AND APPARATUS FOR IMAGE PROCESSING

CLAIM OF PRIORITY

This application claims priority under 35 U.S.C. §119(a) to a Korean Patent Application filed in the Korean Intellectual Property Office on Feb. 21, 2013 and assigned Serial No. 10-2013-0018642, the contents of which are herein incorporated by reference.

BACKGROUND

1. Field of the Invention

Various exemplary embodiments relate to a method and apparatus for image processing.

2. Description of the Related Art

Electronic devices, such as smart phones and tablet computers, may have multiple integrated camera modules. These camera modules may be facing in different directions. When the electronic devices are used to capture two-dimensional images, only one of the camera modules may be activated, leaving the rest of camera modules unused and failing to take advantage of their capabilities. Accordingly, the need exists for new techniques for taking two-dimensional images that utilize multiple camera modules.

SUMMARY

The present disclosure addresses this need. According to one aspect of the disclosure, a method for use in an electronic device is provided, comprising: acquiring a first picture through a first image sensor; acquiring a second picture through a second image sensor; detecting, by a processing circuitry, an image of a body part in the second picture; creating a third picture based on the image of the body part; and displaying the first picture together with the third picture as a preview image.

According to another aspect of the disclosure, a method for use in an electronic device is provided, comprising: acquiring a first picture through a first image sensor; acquiring a second picture through a second image sensor; responsive to a viewing angle of the second image sensor being greater than a threshold value: processing the second picture to detect an image of a body part in the second picture; creating, by a processing circuitry, a third picture based on the image of the body part; and displaying the first picture together with the third picture as a preview image.

According to yet another aspect of the disclosure, an electronic device is provided comprising: a first image sensor; a second image sensor; and a processing circuitry coupled to the first image sensor and the second image sensor, the processing circuitry being configured to: acquire a first picture from the first image sensor; acquire a second picture from the second image sensor; detect an image of a body part in the second picture; create a third picture based on the image of the body part; and display the first picture together with the third picture as a preview image.

According to yet another aspect of the disclosure, an electronic device is provided, comprising: a first image sensor; a second image sensor; and a processing circuitry coupled to the first image sensor and the second image sensor, the processing circuitry being configured to: acquire a first picture from the first image sensor; acquire a second picture from the second image sensor; responsive to a viewing angle of the second image sensor being greater than a threshold value: process the second picture to detect an image of a body part in the second picture, create a third picture based on the image of the body part, and display the first picture together with the third picture as a preview image.

BRIEF DESCRIPTION OF THE DRAWINGS

The above features and advantages of the present invention will become more apparent from the following detailed description when taken in conjunction with the accompanying drawings in which.

DETAILED DESCRIPTION

Aspects of the present disclosure will be described herein below with reference to the accompanying drawings. In the following description, well-known functions or constructions are not described in detail since they would obscure the disclosure in unnecessary detail. Terms described below, which are defined considering functions in the present disclosure, can be different depending on user and operator's intention or practice. Therefore, the terms should be interpreted on the basis of the disclosure.

The present disclosure relates to a technique for processing (e.g., previewing, taking or handling) a plurality of images captured through at least one or more image sensors and an electronic device, for example, a smart phone, thereof. According to various aspects of the present disclosure, an electronic device can simultaneously store, in the same picture, an image acquired from a camera arranged in the rear of the electronic device and a user face picture acquired from a camera arranged in the front of the electronic device.

Figure 1A:
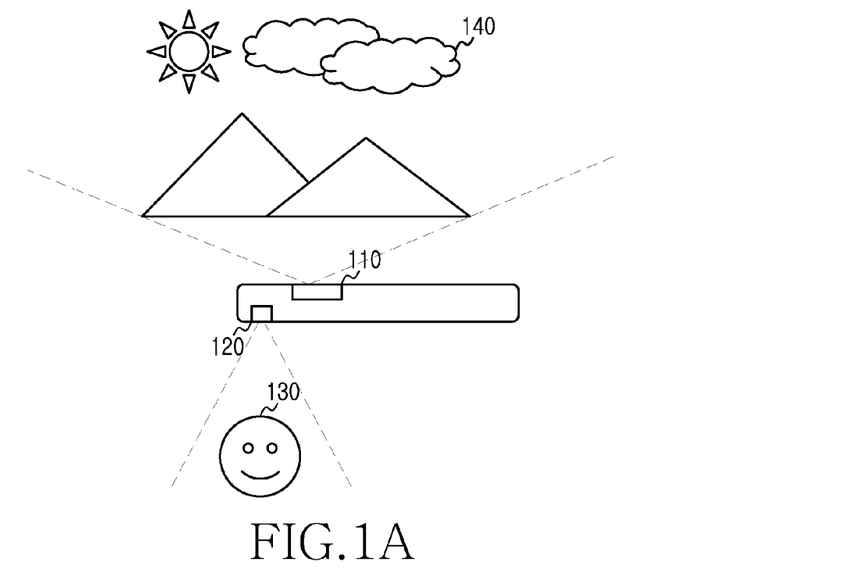
FIG. 1A, FIG. 1B and FIG. 1C are diagrams illustrating an example of a technique for image preview, according to aspects of the present disclosure.
Figure 1B:
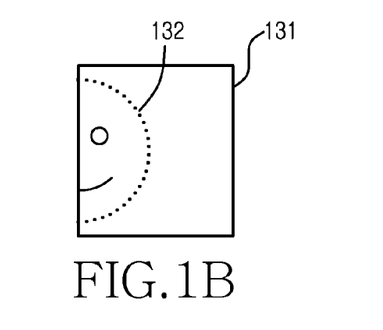
Figure 1C:
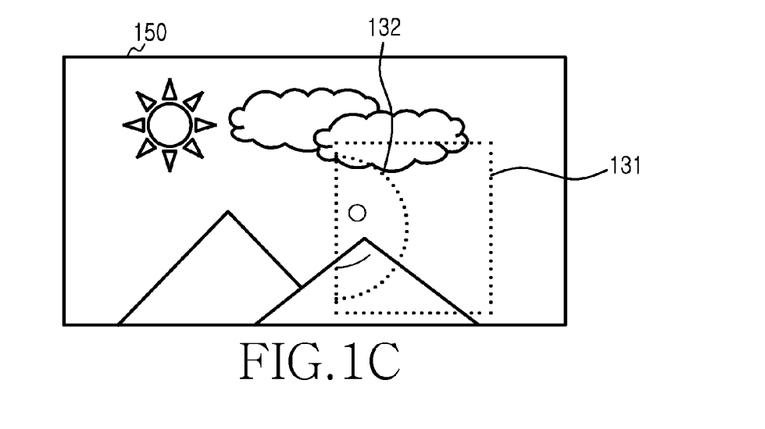

FIGS. 1A to 1C are diagrams illustrating an example of a technique for camera preview, according to aspects of the present disclosure. Referring to FIG. 1A, a portable terminal can have cameras 120 and 110 arranged in the front and rear of the portable terminal, respectively, so as to take pictures of both a user who is using the terminal to take picture of a landscape (or object) and the landscape (or object) itself. In one example, the camera 120 may be disposed on the same side of the portable terminal as a display of the portable terminal. Additionally or alternatively, in another example, the camera 120 may be disposed so that it can capture images in a direction from which the display screen is viewable. Although in the present example, the camera 110 and 120 face in directions that are substantially opposite one another, in other examples, each of the cameras 110 and 120 may face in any two suitable directions that are different from one another.

Referring to FIG. 1B, an example of a technique is provided for synthesizing a preview image. According to the technique, a background picture 140 is acquired by the camera 110 and a user picture 130 is acquired by the camera 120.

The user picture 130 is then cropped, reduced in size, and superimposed on the background picture 140 to produce a combined picture 150. Next, the combined image is displayed on a display screen of the portable terminal as a preview image. Although, in this example, the combined picture 150 is produced by using a Picture-In-Picture (PIP) function to combine the pictures 130 and 140, in other examples, any suitable technique for combining images may be used.

As illustrated in this example, portions of the user's face can be cut from the image 130. When a user shoots a picture of his/her face through the front camera 120 considering the background picture 140 acquired from the rear camera 110, there can be a problem that the user face is driven to the left or right of the screen depending on a viewing angle of the front camera 120 and a position of the user face. The image of the user's face may be cut for various reasons. For example, when the portable terminal simultaneously previews pictures 130 and 140, it may be impossible for the user to aim the portable device in such a way that desirable compositions are obtained of both the user's face and a landscape or another object the user wants to photograph. As another example, when the viewing angle of the front camera 120 is large, i.e., when a distance between the front camera 120 and the user face is large, there can be a problem that the user face is driven to one side and cut as in FIG. 1B. Accordingly, if the user face is driven to the left or right of the screen, there can be a problem that portions of the user face are not visible in the user picture 130 when the background picture 140 and the user picture 130 are combined using the PIP function and previewed as in FIG. 1C.

In some implementations, the portable terminal may take measures to prevent partial images of the user from appearing in the combined picture 150. For example, when previewing pictures acquired through the front and rear cameras, the portable terminal may use various image processing techniques (e.g., image recognition, cropping, zooming) to obtain a certain image region including at least the image corresponding to a given body part (e.g., a face) from a picture acquired from the front camera, such that the body parts (e.g., the face) are not cut, and provide the image corresponding to the processed body parts (e.g., the cropped face) as at least one preview image in a predetermined portion of the picture acquired from the rear camera. Thus, the combined image may be composed of a first most recently captured image by the back camera 110 and a second image that depicts an entire body part (e.g., a face) which is captured by the front camera 120 before the first image is captured.

Figure 2A:
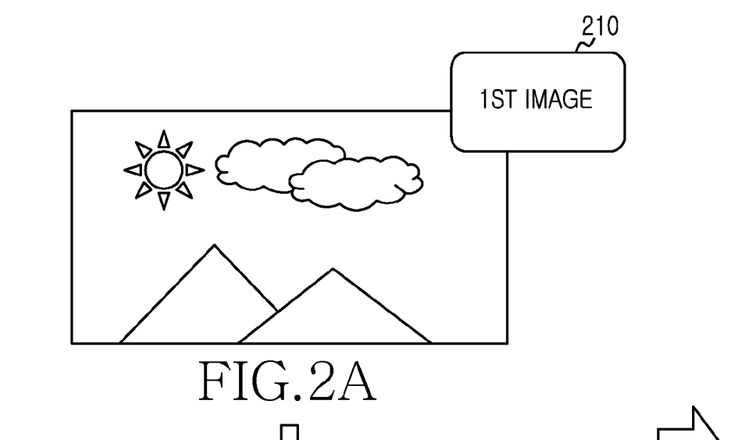
FIG. 2A, FIG. 2B, and FIG. 2C are diagrams illustrating another example of a technique for image preview in a portable terminal, according to aspects of the present disclosure.
Figure 2B:
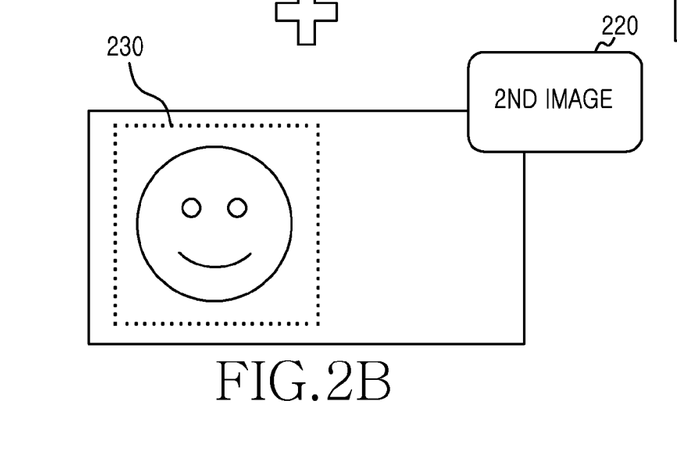
Figure 2C:
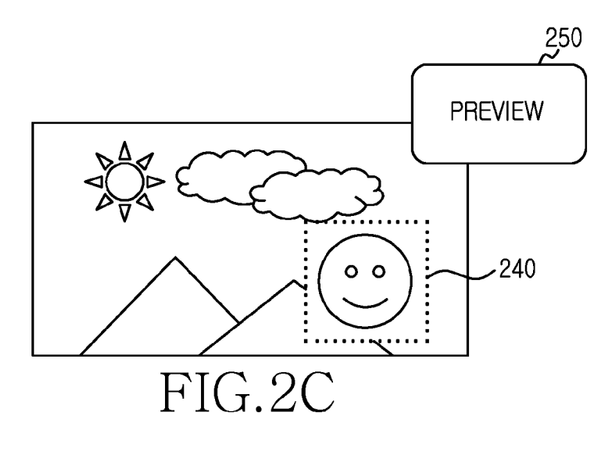

FIGS. 2A to 2C are diagrams illustrating another example of a technique for image preview in a portable terminal, according to aspects of the present disclosure. More particularly, FIG. 2A illustrates a first picture 210 acquired from a rear camera and FIG. 2B illustrates a second picture 220 acquired from a front camera. Desirably, the first picture 210 acquired from the rear camera is a background picture, and the second picture 220 acquired from the front camera is a picture of a person (e.g., the photographer) including the person's face. FIG. 2C illustrates a combined picture 250 that is synthesized by combining the first picture 210 and the second picture 220. In some implementations, to synthesize the combined picture 250, the electronic device detects a face in the second picture 220 through a face detection algorithm, crops a certain region 230 including the detected face from the second picture 220, and previews the cropped region 230 in a specific location 240 within the first picture 210. In some implementations, when a face is not detected in the second picture, the portable terminal may display a default portion of the second picture within the first picture 210 or not display the second picture at all.

The face detection algorithm can be a knowledge-based method, a feature invariant approach method, a template matching method, an appearance-based method and/or any other suitable face detection algorithm. The knowledge-based method is a method of detecting a person using a rule between person elements inferred from a previous knowledge about the human. For example, the knowledge-based method extracts features of a symmetric form of eyes and noses and mouths underlying the eyes and then, attempts to detect these features from a picture. Contrary to the knowledge-based method, the feature invariant approach method extracts an invariant feature irrelevant to rotation of a person or size change or illumination change for person detection and then, attempts the person detection using the extracted invariant feature. This method detects a person through a search and classification work between previously extracted features and features of an input picture, using facial features, texture, skin, multiple features and the like. The template matching method previously extracts information about a standard face pattern and then extracts a correlation between an input picture and a predefined template, thereby attempting person detection. Generally, the standard face pattern independently registers and uses a face type, eyes, nose, mouth and the like as standard patterns. And, the person detection is finally determined from a relational element between the detected standard face patterns. Contrary to the template matching method using a previously defined template, the appearance-based method uses a method of creating a template through learning from a picture. Features obtained through the learning can have a format of a distribution model, or can have a format of a discriminant function for person detection. Generally, to promote determination efficiency and detection performance, the appearance-based method attempts person detection after performing a dimension reduction work.

Figure 3A:
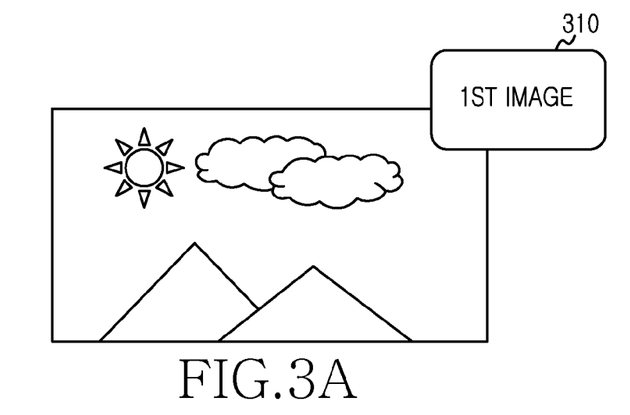
FIG. 3A, FIG. 3B and FIG. 3C are diagrams illustrating yet another example of a technique for image preview according to aspects of the present disclosure.
Figure 3B:
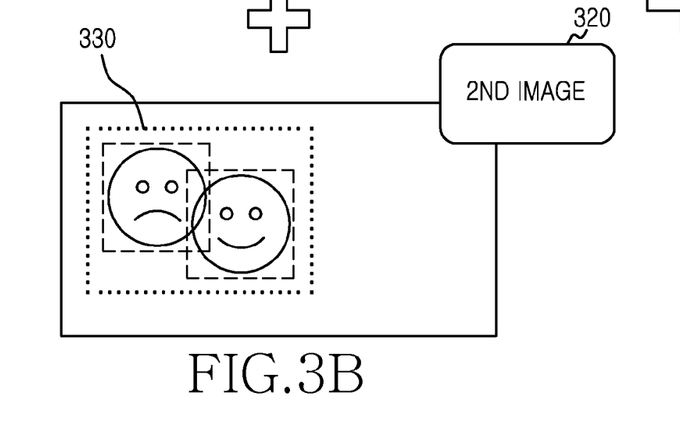
Figure 3C:
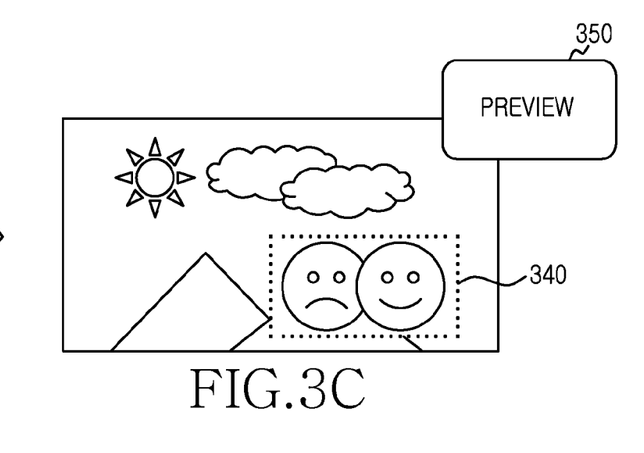

FIGS. 3A to 3C are diagrams illustrating yet another example of a technique for image preview according to aspects of the present disclosure.

FIG. 3A illustrates a first picture 310 acquired from a rear camera, and FIG. 3B illustrates a second picture 320 acquired from a front camera. The first picture 310 acquired from the rear camera may be a background picture, and the second picture 320 acquired from the front camera may be a picture including the faces of multiple people.

Before combining the first picture 310 and the second picture 320 through a PIP function, the electronic device can detect faces of the people in the second picture 320 through a face detection algorithm, crop a certain region 330 including the detected faces of the two persons from the second picture 320, and preview (350) the cropped region 330 in a specific location 340 within the first picture 310. According to aspects of the disclosure, the electronic device can crop a certain region including only one of the faces in the picture 320 and preview the cropped region in the specific location 340 within the first picture 310. As noted above, the face detection algorithm can be a knowledge-based method, a feature invariant approach method, a template matching method, an appearance-based method and the like.

In FIG. 2 and FIG. 3, examples of simultaneously capturing pictures through front and rear cameras have been described, but the pictures can be taken in sequence according to implementation. For instance, after a background picture captured by the rear camera is taken, a timer may be enabled and, after the expiration of the timer, a picture of a subject (e.g., a face of a person) captured by the front camera may be taken.

Figure 4:
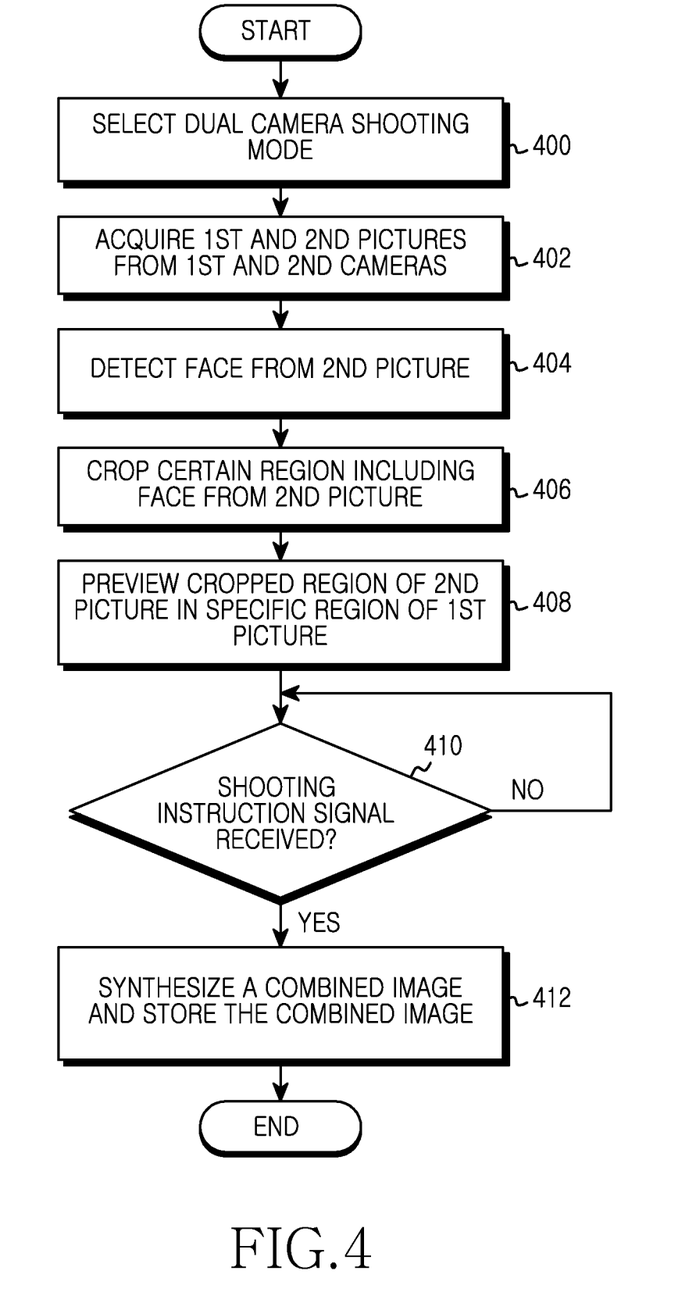
FIG. 4 is a flowchart of a process for image preview according to aspects of the present disclosure.

FIG. 4 is a flowchart of a process for image preview according to aspects of the present disclosure. In step 400, an electronic device (e.g., a camera, a smart phone, etc.) selects a dual camera shooting mode. At this time, front and rear camera modules are all activated.

In step 402, the electronic device acquires a first picture and a second picture from a first camera and a second camera, respectively. Desirably, the first camera can be arranged in rear of the electronic device and the second camera can be arranged in front of the electronic device. Thus, the first picture may be a background picture, and the second picture may be a picture of a person including a face.

In step 404, the electronic device detects a face from the second picture acquired by the second camera, using a corresponding face detection algorithm.

In step 406, the electronic device crops a certain region including the face in the second picture. That is, the electronic device cuts out the certain region including the face from the second picture.

In step 408, the electronic device outputs a preview screen by displaying the first picture and superimposing the second picture over a specific region of the first picture (e.g., by using a PIP function). Next, if a shooting instruction signal is received in step 410, the electronic device proceeds to step 412 and synthesizes a combined image that includes the second picture superimposed over the first picture. Afterwards, the electronic device stores the combined image in memory and with this completes execution of the process.

Figure 5:
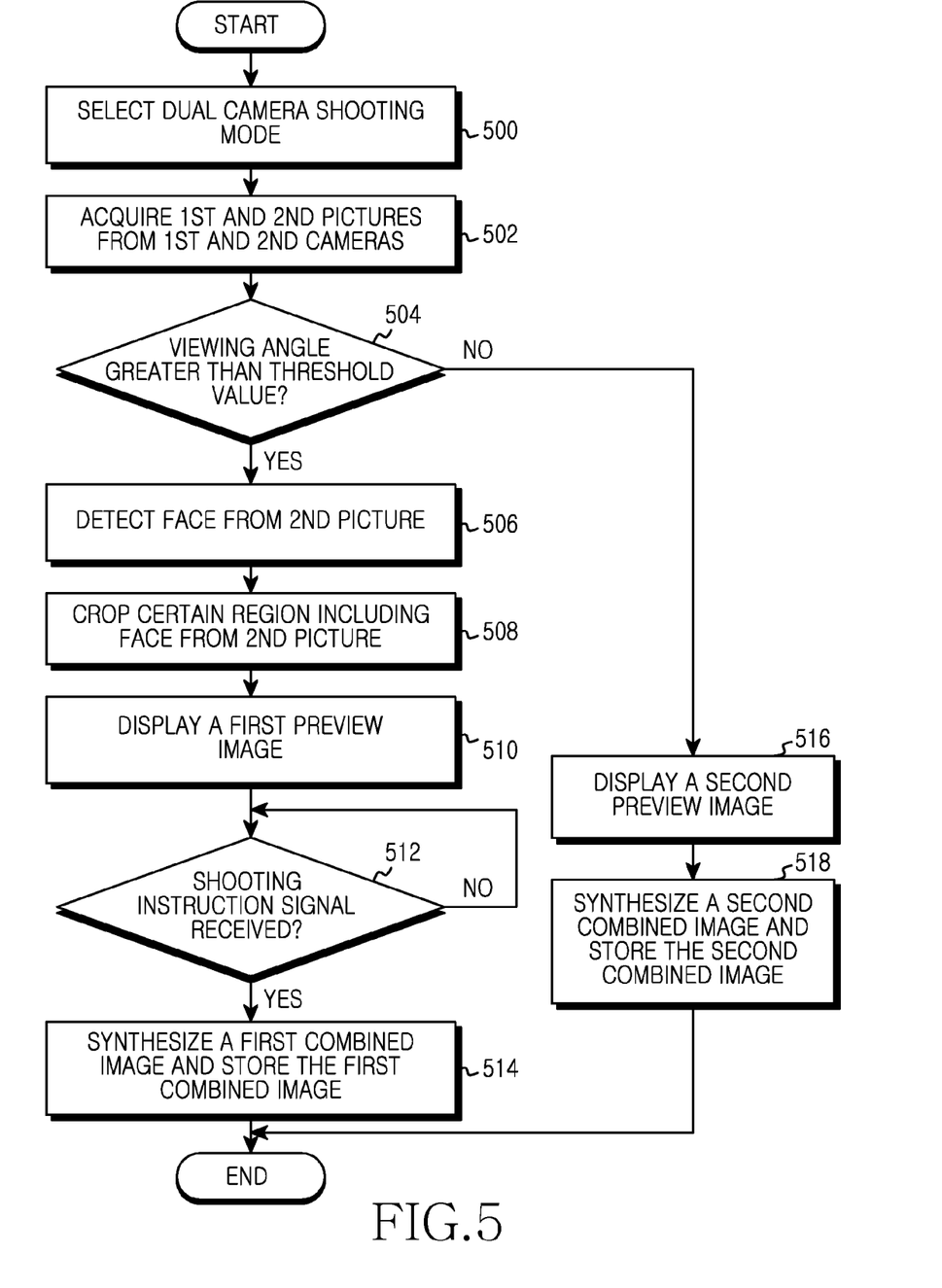
FIG. 5 is a flowchart of another process for image preview according to aspects of the present disclosure.

FIG. 5 is a flowchart of another process for image preview according to aspects of the present disclosure.

In step 500, an electronic device (e.g., a camera, a smart phone, etc.) selects a dual camera shooting mode. At this time, both front and rear camera modules of the electronic device are activated.

In step 502, the electronic device acquires a first picture and a second picture from a first camera and a second camera, respectively. Desirably, the first camera can be arranged in the rear of the electronic device, or the second camera can be arranged in the front of the electronic device. Thus, the first picture can be a background picture, and the second picture can be a picture of a person including a face.

In step 504, the electronic device determines whether a viewing angle of the electronic device is greater than a threshold value. In one example, the viewing angle may be an angle at which the second camera can take a picture. As the viewing angle decreases, the field of view of the second camera also decreases. As the viewing angle increases, the field of view of the second camera also increases. Additionally or alternatively, the viewing angle can vary depending on a distance between a subject (e.g., a person face) and the second camera. For example, as the distance between the subject (e.g., person face) and the camera increases, the field of view of the camera increases. As the distance between the subject (e.g., person face) and the second camera becomes shorter, the field of view of the camera decreases. Thus, as a non-limiting example, the viewing angle of the second camera may be determined based on a characteristic of the optics of the camera (e.g., focal length) or an estimate of a distance between the camera and an object of interest (e.g., a human face).

When the viewing angle is greater than a threshold value in step 504, the electronic device proceeds to step 506. n step 506, the electronic device detects a face in the second picture acquired by the second camera, using a corresponding face detection algorithm. In step 508, the electronic device crops a certain region including the face in the second picture. That is, the electronic device cuts out the certain region including the face from the second picture. In step 510, the electronic device previews the cropped region of the second picture in a specific region of the first picture using a PIP function. If a shooting instruction signal is received in step 512, the electronic device proceeds to step 514 and synthesizes the first picture and the cropped region of the second picture and stores the synthesized result as one image or video.

When the viewing angle is less than the threshold value, the process proceeds to step 516. In step 516, the electronic device does not crop the second picture. Rather, the electronic device minimizes the entire second image just previews the second picture in a specific region of the first picture using the PIP function. After that, in step 518, according to a shooting instruction signal, the electronic device synthesizes a combined image by superimposing the first picture over the second picture and stores the synthesized result in memory.

Figure 6:
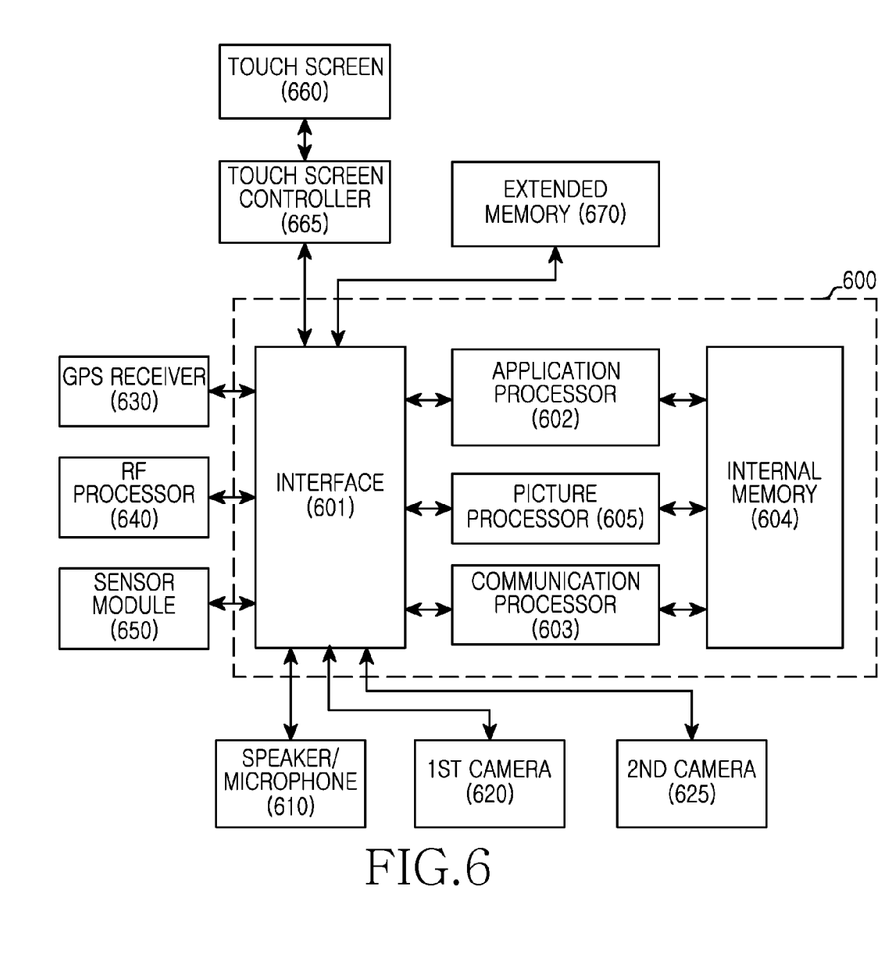
FIG. 6 illustrates a construction of an electronic device according to an aspect of the present disclosure.

FIG. 6 is a diagram of an electronic device, according to aspects of the disclosure.

The electronic device can be a portable electronic device, and can be a device such as a portable terminal, a mobile terminal, a mobile pad, a media player, a tablet computer, a handheld computer, or a Personal Digital Assistant (PDA). Also, the electronic device may be any portable electronic device including a device combining two or more functions among these devices.

Referring to FIG. 6, the electronic device includes a controller 600, a speaker/microphone 610, a first camera 620, a second camera 625, a Global Positioning System (GPS) receiver 630, a Radio Frequency (RF) processor 640, a sensor module 650, a touch screen 660, a touch screen controller 665, and an extended memory 670.

The controller 600 can include an interface 601, one or more processors 602 and 603, an internal memory 604, and a picture processor 605. In some implementations, the entire controller 600 may be also called a processor. Additionally or alternatively, any of the interface 601, the application processor 602, the communication processor 603, the picture processor 605, and the internal memory 604 can be separate constituent elements or can be integrated together as one or more integrated circuits.

The picture processor 605 may include an Image Signal Processor (ISP) or any other suitable processing circuitry that is configured to convert output data (e.g., raw data) from the first camera 620 and the second camera 625 into image frame (Red, Green, Blue (RGB)/YUV) data having a format of a predefined rule, and provides the image frame data to the application processor 602.

The application processor 602 may include an x86 processor, an ARM-based processor, a MIPS-based processor, and or any other suitable processing circuitry. That is configured to execute various software programs and perform various functions for the electronic device. The communication processor 603 may include any suitable processing circuitry for conducting for voice communication and data communication. Moreover, in some instances, the processors 602 and 603 play even a role of executing a specific software module (i.e., instruction set) stored in the extended memory 670 or the internal memory 604 and performing specific various functions corresponding to the module. That is, the processors 602, 603, and 605 may operate in conjunction with one another to execute software modules stored in the extended memory 670 or the internal memory 604, and receive picture data from the picture processor 605, and perform a preview method.

In some implementations, when a dual camera shooting mode is selected, the application processor 602 acquires a first picture and a second picture from a first camera 620 and a second camera 625, respectively, and detects a face from the second picture acquired by the second camera using a corresponding face detection algorithm, and crops a certain region including the face within the second picture, and previews the cropped region of the second picture in a specific region of the first picture using a PIP function and, upon reception of a shooting instruction signal, synthesizes the first picture and the cropped region of the second picture, and stores the synthesized result as one image or video in the memories 604 and 670.

According to another aspect, when a dual camera shooting mode is selected, the application processor 602 acquires a first picture and a second picture from a first camera 620 and a second camera 625, respectively, and, when a viewing angle is greater than a threshold value, the application processor 602 detects a face from the second picture acquired by the second camera using a corresponding face detection algorithm, crops a certain region including the face within the second picture, and previews the cropped region of the second picture in a specific region of the first picture using a PIP function and, upon reception of a shooting instruction signal, synthesizes the first picture and the cropped region of the second picture, and stores the synthesized result as one image or video in the memories 604 and 670. Alternatively, when the viewing angle is less than the threshold value, the application processor 602 may not crop the second picture. Rather, the application processor 602 may preview the entire second picture in the specific region of the first picture using the PIP function and, upon reception of a shooting instruction signal, synthesizes a composite picture from the first picture and the second picture and stores the synthesized picture as one image or video.

Other processors (not shown) can include one or more data processors, image processors, or codecs. The data processor, the image processor and the codec may be separately constructed. Also, they may be constructed by various processors performing different functions. The interface 601 is connected to the touch screen controller 665 and extended memory 670 of the electronic device. Additionally or alternatively, the other processors may be integrated together. Furthermore, in some implementations, any of: one or more of the other processors, the application processor, the image processor, and the communication processor may be integrated together.

The sensor module 650 can be coupled to the interface 601 and enable various functions. For example, a motion sensor and an optical sensor can be coupled to the interface 601 and sense a motion of the electronic device and sense light from the exterior, respectively. Additionally or alternatively, a global positioning system and other sensors such as a temperature sensor, a biometric sensor, or the like can be coupled to the interface 610 and perform related functions.

The first and second cameras 620 and 625 can be coupled with the sensor module 650 through the interface 601 and perform a camera function such as photo and video clip recording. Also, in another aspect, the first and second cameras 620 and 625 may be separated independent from the electronic device and connected with the electronic device using wireless connection such as Near Field Communication (NFC), Wireless Fidelity (WiFi) Direct or the like.

In more detail, the first camera 620 is located in rear of the electronic device, and the second camera 625 is located in front of the electronic device. Also, the first and second cameras 620 and 625 can include an optical unit, an image sensor, a signal processing unit (not shown) and the like. The optical unit may be driven by a mecha-shutter, a motor, and an actuator, or may perform operations of zooming, focusing and the like by the actuator. The optical unit captures a peripheral image, and the image sensor senses the image captured by the optical unit and converts the sensed image into an electrical signal. Here, the image sensor can be a Complementary Metal Oxide Semiconductor (CMOS) or a Charged Coupled Device (CCD), and can be a high definition image sensor. The image sensor of the camera may embed a global shutter. The global shutter performs a function similar to that of the mecha-shutter that is built in the image sensor.

In an aspect of the present disclosure, the image sensor can be a sensor capable of sensing an image of Ultra High Definition (UHD) class or more. And, the image sensed in the image sensor is converted into a digital image through the signal processing unit and is outputted. Output data from the plurality of cameras can be raw data.

The RF processor 640 performs a communication function. For example, under the control of the communication processor 603, the RF processor 640 converts an RF signal into a baseband signal and provides the baseband signal to the communication processor 603, or converts a baseband signal from the communication processor 603 into an RF signal and transmits the RF signal. Here, the communication processor 603 processes a baseband signal in various communication schemes. For example, the communication scheme can include, though not limited to, a Global System for Mobile Communication (GSM) communication scheme, an Enhanced Data GSM Environment (EDGE) communication scheme, a Code Division Multiple Access (CDMA) communication scheme, a Wireless-Code Division Multiple Access (W-CDMA) communication scheme, a Long Term Evolution (LTE) communication scheme, an Orthogonal Frequency Division Multiple Access (OFDMA) communication scheme, a Wireless-Fidelity (Wi-Fi) communication scheme, a Wireless interoperability for Microwave Access (WiMAX) communication scheme or/and a Bluetooth communication scheme.

The speaker/microphone 610 can take charge of voice recognition, voice replication, digital recording, and audio stream input and output of a phone function. That is, the speaker/microphone 610 converts a voice signal into an electrical signal, or converts an electrical signal into a voice signal. Though not illustrated, a detachable earphone, headphone or headset can be connected to the electronic device through an external port.

The touch screen controller 665 can be coupled to the touch screen 660. The touch screen 660 and the touch screen controller 665 can detect a contact and a motion or an interruption thereof by using, though not limited to, any multi-touch sensing technology including other proximity sensor arrays or other elements as well as capacitive, resistive, infrared and surface acoustic wave technologies for determining one or more contact points with the touch screen 660.

The touch screen 660 provides an input/output interface between the electronic device and a user. That is, the touch screen 660 forwards a user's touch input to the electronic device. Also, the touch screen 660 is a medium for showing an output of the electronic device to the user. That is, the touch screen 660 shows a visual output to the user. This visual output is presented in the form of a text, a graphic, a video, and a combination thereof. In various aspects of the present disclosure, the touch screen 660 displays images taken by the first and second cameras 620 and 625 and shooting information.

The touch screen 660 can use various displays. For example, the touch screen 660 can use, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The GPS receiver 630 converts signals received from artificial satellites into information of position, speed, time, etc. For example, distances between the satellites and the GPS receiver 630 are determined by multiplying a speed of light and signal reaching time, and a position of the electronic device is measured in the known triangulation principle by obtaining accurate locations and distances of the three satellites.

The extended memory 670 or the internal memory 604 can include any suitable type of volatile and/or non-volatile memory such as one or more magnetic disk storage devices, one or more optical storage devices, and/or flash memories (for example, Not AND (NAND) memories, Not OR (NOR) memories). The extended memory 670 or the internal memory 604 stores software. A software constituent element includes an Operating System (OS) software module, a communication software module, a graphic software module, a user interface software module, an MPEG module, a camera software module, one or more application software modules and the like. Also, because the module, the software constituent element, can be expressed as a set of instructions, the module may be also expressed as an instruction set. The module may be also expressed as a program.

Further to various aspects of the present disclosure, the extended memory 670 can store images or videos taken by the first camera 620 and the second camera 625.

The OS software includes various software constituent elements controlling general system operation. Control of the general system operation represents, for example, memory management and control, storage hardware (device) control and management, power control and management and the like. This OS software performs even a function of making smooth communication between various hardware (devices) and software constituent elements (modules).

The communication software module can perform communication with other electronic devices such as computers, servers, and/or portable terminals through the RF processor 640. And, the communication software module is constructed in a protocol structure corresponding to a corresponding communication scheme.

The graphic software module includes various software constituent elements for providing and displaying a graphic on the touch screen 660. The term of graphic is used as meaning including a text, a web page, an icon, a digital image, a video, an animation and the like.

The user interface software module includes various software constituent elements associated with a user interface. The user interface software module includes information about how a state of the user interface is changed, whether the change of the state of the user interface is carried out in which condition, or the like.

The camera software module includes a camera related software constituent element enabling camera related processes and functions. The application module includes a web browser including a rendering engine, an electronic mail (e-mail), an instant message, word processing, keyboard emulation, an address book, a touch list, a widget, Digital Right Management (DRM), voice recognition, voice replication, a position determining function, a location-based service and the like. The memories 670 and 604 can include additional modules (instructions) besides the aforementioned modules. Or, according to need, the memories 670 and 604 may not include some modules (instructions). In various aspects of the present disclosure, the web browser includes an execution button and a selection menu controlling displaying of dynamically changing objects within a web page.

In relation to various aspects of the present disclosure, the application module includes instructions (referring to FIG. 4 and FIG. 5) for providing communication channels and contacts based on situation recognition.

For instance, the application module includes an instruction of, when a dual camera shooting mode is selected, acquiring a first picture and a second picture from a first camera 620 and a second camera 625, respectively, and detecting a face from the second picture acquired by the second camera using a corresponding face detection algorithm, and cropping a certain region including the face within the second picture, and previewing the cropped region of the second picture in a specific region of the first picture using a PIP function and, upon reception of a shooting instruction signal, synthesizing the first picture and the cropped region of the second picture, and storing the synthesized result as one image or video in the memories 604 and 670.

According to another aspect, the application module includes an instruction of, when a dual camera shooting mode is selected, acquiring a first picture and a second picture from a first camera 620 and a second camera 625, respectively, and detecting a face from the second picture acquired by the second camera using a corresponding face detection algorithm when a viewing angle is greater than a threshold value, and cropping a certain region including the face within the second picture, and previewing the cropped region of the second picture in a specific region of the first picture using a PIP function and, upon reception of a shooting instruction signal, synthesizing the first picture and the cropped region of the second picture, and storing the synthesized result as one image or video in the memories 604 and 670. Also, the application module further includes an instruction of, when the viewing angle is less than the threshold value, not cropping the certain region including the face from the second picture, and previewing the second picture in the specific region of the first picture using the PIP function and, upon reception of a shooting instruction signal, synthesizing the first picture and the second picture and storing the synthesized result as one image or video.

Also, various functions of the electronic device according to the present disclosure mentioned above and to be mentioned below can be executed by hardware including one or more stream processing and/or Application Specific Integrated Circuits (ASICs), and/or software, and/or a combination of them.

The above description has been made in which an aspect of the present disclosure is applied to a portable terminal, but it is undoubted that the aspect of the present disclosure is applicable even to a dual camera. Also, an aspect of the present disclosure has been described in which a first camera and a second camera are located in front and rear of an electronic device. But, according to different implementation, the first camera and the second camera can be in the same location.

As described above, when previewing pictures acquired through the front and rear cameras, aspects of the present disclosure can crop a face from the picture acquired by the front camera and synthesize the cropped face to a predetermined range of the picture acquired by the rear camera, thereby previewing a user face right.

Also, the aspects of the present disclosure can reduce a trouble of determining a composition dependent on a position of a face so as to locate the face within a predetermined range such that the face is not cut.

It should be noted that FIGS. 4 and 5 are provided as examples only. Some of the steps illustrated in those figures can be performed in a different order, performed concurrently, or altogether omitted. As noted above, the processes described with respect to FIGS. 4 and 5 may be performed during an image preview mode of an electronic device. In some implementations, when the electronic device is in the image preview mode, during each successive period p, the electronic device may: receive a first image from a first camera, receive a second image from a second camera, combine the first image and the second image, as discussed above, to produce a combined image, and display the combined image on a display screen as a preview image. In some implementations, a preview image may be an image that is not saved on the electronic device for future viewing. For example, the preview image may be an image that is not stored at all in non-volatile memory of the electronic device or not stored in the non-volatile memory in a manner that permits the user to retrieve the image and view the image later. In some implementations, the combined image may be subsequently discarded if a shooting instruction is not received. Additionally or alternatively, in some implementations, if a shooting instruction is received, the combined image may be stored in a non-volatile memory for future viewing.

In some implementations, while in image preview mode, the electronic device may receive a first image from a first camera and a second image from a second camera. The first image and the second image may be received during each period p. The electronic device may process the first image by using an image processing technique to determine whether the first image includes a predetermined object (e.g., a picture of an entire human face). When, a first image is identified that includes the picture of the predetermined object, the electronic device may select the identified first image for use in creating a combined image. Next, during a subsequent period p, the electronic device may receive a second image and combine the second image received during the subsequent period p with the first image that is selected for use in creating the combined image. In doing so, the electronic device may replace a first image received during the subsequent period p with the first image selected for use in creating the combined image, which is received during a period p that precedes the subsequent period p.

In some implementations, while in image preview mode, the electronic device may receive a second image from a second camera. Next, in response to a shooting instruction (e.g., a user pressing a "capture" button), the electronic device may start a timer. Prior to the timer expiring, the user may aim electronic device towards his face. When the timer is expired, the electronic device may capture a first image using the first camera. Afterwards the electronic device may create a combined image by combining the first image with the second image and store the combined image for future viewing. Although in the above examples, the first camera is front camera and the second camera is a rear camera, in other examples the first camera may be a rear camera the second camera may be a front camera. Thus, in some implementations, pictures captured by a rear camera may be presented inside pictures captured by a front camera.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the disclosure has been provided with reference to certain specific examples, it will be understood by those skilled in the art that various changes in form and details may be made therein without departing from the spirit and scope of the disclosure as defined by the appended claims.

What is claimed is:

1. A method for use in an electronic device, comprising:
acquiring a first picture through a first image sensor;
acquiring a second picture through a second image sensor,
detecting, by a processing circuitry, an image of an entire body part in the second picture;
creating a third picture based on the image of the entire body part; and
displaying the first picture together with the third picture as a preview image,
wherein the creating the third picture comprises:
cropping a certain region including the entire body part in the second picture, when a viewing angle of the second image sensor is greater than a threshold value, and creating the third picture using the cropped region of the second picture; or
creating the third picture based on the image of the entire body part without cropping, when the viewing angle of the second image sensor is less than the threshold value, and
wherein when the entire body part is not detected in the second picture, displaying the first picture and a default portion of the second as the third picture or displaying the first picture as the third picture.

2. The method of claim 1, wherein the detecting of the image of the entire body part in the second picture comprises detecting at least one human face.

3. The method of claim 1, wherein the creating of the third picture further comprises at least one of enlarging and reducing the image of the entire body part.

4. The method of claim 1, wherein the detecting, creating, and displaying steps are performed while the electronic device is in an image preview mode, the method further comprising responsive to a shooting instruction, generating a combined image based on the first image and third image and storing the combined image in a non-volatile memory.

5. The method of claim 1, further comprising, displaying the first picture together with the second picture as the preview image, when the viewing angle of the second image sensor is less than the threshold value.

6. The method of claim 1, wherein the displaying of the first picture together with the third picture as the preview image comprises superimposing the third picture on the first picture.

7. An electronic device comprising:
a first image sensor,
a second image sensor; and
a processing circuitry coupled to the first image sensor and the second image sensor, the processing circuitry being configured to:
acquire a first picture from the first image sensor;
acquire a second picture from the second image sensor,
detect an image of an entire body part in the second picture;
create a third picture based on the image of the entire body part; and
display the first picture together with the third picture as a preview image,
wherein the processing circuitry is configured to crop a certain region including the entire body part in the second picture, when a viewing angle of the second image sensor is greater than a threshold value, and create the third picture using the cropped region of the second picture; or create the third picture based on the image of the entire body part without cropping, when the viewing angle of the second image sensor is less than the threshold value, and wherein when the entire body part is not detected in the second picture, displaying the first picture and a default portion of the second as the third picture or displaying the first picture as the third picture.

8. The electronic device of claim 7, wherein:
the first image sensor faces in a first direction of a first surface of the electronic device, and
the second image sensor faces in a second direction of a second surface of the electronic device.

9. The electronic device of claim 7, wherein the detect step of the image of the entire body part in the second picture comprises detecting at least one human face.

10. The electronic device of claim 7, wherein the processing circuitry further comprises one of enlarging and reducing the image of the entire body part.

11. The electronic device of claim 7, wherein the detect, create, and display steps are performed while the electronic device is in an image preview mode, and the processing circuitry is further configured to generate a combined image based on the first image and third image and store the combined image in a non-volatile memory, in response to a shooting instruction.

12. The electronic device of claim 7, wherein the processing circuitry is further configured to display the first picture together with the second picture as the preview image when the viewing angle of the second image sensor is less than the threshold value.

13. The electronic device of claim 7, wherein the processing circuitry is configured to use a Picture In Picture (PIP) function in order to display the first picture together with the first picture.

* * * * *